(12) United States Patent
Moeltgen et al.

(10) Patent No.: US 7,169,198 B2  
(45) Date of Patent: Jan. 30, 2007

(54) MICROCRYSTALLINE α-AL₂O₃ SHAPED BODY, METHOD FOR THE PRODUCTION AND USE THEREOF

(75) Inventors: Paul Moeltgen, Laufenburg (DE); Wilhelm Pirmin, Laufenburg (DE); Frank J. Clemens, Frauenfeld (CH)

(73) Assignee: Treibacher Schleifmittel GmbH, Laufenburg (DE)

( * ) Notice: Subject to any disclaimer, the term of this patent is extended or adjusted under 35 U.S.C. 154(b) by 0 days.

(21) Appl. No.: 10/221,705

(22) PCT Filed: Feb. 8, 2001

(86) PCT No.: PCT/EP01/01336

§ 371 (c)(1),  
(2), (4) Date: Sep. 13, 2002

(87) PCT Pub. No.: WO01/79135

PCT Pub. Date: Oct. 25, 2001

(65) Prior Publication Data

US 2003/0029094 A1     Feb. 13, 2003

(30) Foreign Application Priority Data

Apr. 17, 2000   (DE) .............................. 100 19 184

(51) Int. Cl.  
*C04B 35/10* (2006.01)  
*C04B 35/64* (2006.01)  
*B28B 1/00* (2006.01)  
*B28B 3/20* (2006.01)  
*B28B 3/22* (2006.01)  
*B28B 3/00* (2006.01)

(52) U.S. Cl. ..................... 51/293; 51/309; 501/127; 264/638; 264/681; 264/669; 264/670; 264/653

(58) Field of Classification Search ................. 51/307, 51/309, 293; 501/127; 264/638, 681, 669, 264/670, 653  
See application file for complete search history.

(56) References Cited

U.S. PATENT DOCUMENTS

| 4,285,732 A | * | 8/1981 | Charles et al. .............. 501/101 |
| 4,799,938 A | | 1/1989 | Janz et al. .................... 51/293 |
| 5,185,012 A | * | 2/1993 | Kelly ........................... 51/295 |
| 5,194,072 A | | 3/1993 | Rue et al. ..................... 51/309 |
| 5,651,801 A | * | 7/1997 | Monroe et al. ............... 51/309 |

FOREIGN PATENT DOCUMENTS

| DE | 19602525 | * | 8/1997 |
| DE | 19618129 | * | 11/1997 |
| DE | 19629690 | * | 1/1998 |
| EP | 0263810 A2 | | 1/1987 |
| EP | 0384489 A2 | | 2/1990 |
| EP | 0395088 A2 | | 4/1990 |
| EP | 394500 | * | 10/1990 |
| EP | 394501 | * | 10/1990 |

* cited by examiner

*Primary Examiner*—Michael Marcheschi  
(74) *Attorney, Agent, or Firm*—Connolly Bove Lodge & Hutz LLP

(57) ABSTRACT

The invention relates to a method for the production of a sintered, microcrystalline α-Al₂O₃-based shaped body, which are used, for example, as abrasive bodies, wherein an α-Al₂O₃ powder is used as starting material, said powder having an average particle diameter of <2 μm, and processed with at least one binder and a solvent with the purpose of obtaining an extrudable material that is subsequently extruded. The extrudate is then further processed into a shaped body that is sintered at a temperature range of between 1300° C. and 1750° C.

18 Claims, 1 Drawing Sheet

MICROCRYSTALLINE α-AL$_2$O$_3$ SHAPED BODY, METHOD FOR THE PRODUCTION AND USE THEREOF

FIELD OF THE INVENTION

The present invention relates to microcrystalline α-Al$_2$O$_3$ shaped bodies such as used, for example, as sintered abrasive grains, having high hardness, density and Al$_2$O$_3$ content.

BACKGROUND OF THE INVENTION

Abrasive grains comprised of Al$_2$O$_3$ are processed industrially into abrasives in large quantities due to their great hardness, chemical inertia and high temperature resistance. In this respect, so-called sintered corundum produced via a ceramic or chemical route is utilized for certain areas of application in addition to melting corundum that can be produced relatively cost-efficiently in an electrical arc furnace and which therefore accounts for the largest share of the production of abrasive materials. The advantages of sintered corundums in terms of abrasion engineering in certain grinding operations based on their microcrystalline structure have been known for approximately 50 years.

Thus, for example, polycrystalline Al$_2$O$_3$ bodies are described in U.S. Pat. No. 3,909,991 whose crystallite size lies in the submicron range and whose density amounts to over 95% of theoretical density. Production occurs through hot pressing from a mixture of soot and granulated Al$_2$O$_3$ that, according to U.S. Pat. No. 3,079,243, is obtained by crushing cold-pressed Al$_2$O$_3$ shaped bodies. The process is relatively expensive and poorly suitable for large-scale industrial production.

In EP-B-0 152 768, an abrasive grain is described that is produced by way of sol-gel technology at relatively low sintering temperatures. In this process, crystallization germs are added as sintering aids that accelerate the sintering process and prevent uncontrolled crystal growth. The microcrystalline abrasive grains produced in this fashion dispose of a submicron structure and are used preferably in abrasive disks with a ceramic binding for precision grinding. Even more finely structured corundum abrasive grains with a median crystallite size of 0.2 μm are obtained via the sol-gel technology according to EP-B-0 408 771.

EP-B-0 725 045 describes a method for the production of sintered α-Al$_2$O$_3$ bodies according to which microcrystalline abrasive grains can be produced via a conventional ceramic technology even without the relatively expensive sol-gel process.

All methods mentioned above comprise as one process phase the crushing and treatment of the green body or sintering body for abrasive granulation which is done according to conventional methods (crushers, cylinder crushers, or similar). With this type of crushing, one does not obtain a preferable grain shape, but it will lead to a grain band with the most varying grain shapes and grain sizes, and the only option is to enrich—to a limited degree—certain grain shapes and grain sizes by selecting suitable crushing aggregates.

It must be observed, however, that not only the microstructure but also the geometric shape and the size of the abrasive grain itself plays a decisive role in the abrasion process. For example, for certain areas of application in which only minor forces act upon the abrasive grain, aggressive, sharp-edged and splinter-shaped abrasive grains are preferred while in other areas of application in which, for example, the abrasive grain is subjected to high pressures, compact, cubic grains have proved to be suitable. The grain shape itself, however, can only be influenced to a certain, limited extent through conventional treatment with jaw crushers, cylinders and mills, and the yield of grains with a specific grain shape within a defined grain size is usually relatively low in relation to the total grain amount produced. On the other hand, a precisely defined grain shape and grain size is often required for the abrasion process itself in order to assure a certain amount of abrasion and surface quality. But since the grain distribution on the grain band conforms only to a limited degree to the grain sizes and shapes required for the grinding process, costly follow-up processing or additional comminution will be necessary in order to meet the actual demand. This leads to the fact that in the treatment and screening of abrasive granulation, there will always be a relatively large portion of "waste", i.e. abrasive grains that can no longer be used in the production of abrasives. The development works in the area of abrasive granulation of recent years therefore has aimed not only at quality improvement and increased performance but also at a defined production of abrasive granulation with a certain grain shape and grain size.

For example, U.S. Pat. No. 3,387,957 describes a microcrystalline abrasive grain based on bauxite that has the shape of a small rod and that is produced through extrusion of a mixture of finely ground bauxite; a liquid, preferably water; and a binder. This way, it was not only possible to deliberately produce a defined granulation, but it also turned out that the resulting rods, as the preferred geometric shape, showed particularly good abrasive results for certain grinding operations such as rough grinding. However, the abrasive performance may be negatively influenced by the fact that its contents of aluminum oxide amounts to only approximately 85–88 weight percent, while the other components such as Fe$_2$O$_3$, SiO$_2$, CaO$_2$ and MgO do not possess the necessary physical properties to be effective as abrasives. The contents of α-Al$_2$O$_3$ is all the more reduced through the fact that under the sinter conditions at hand mullite (3 Al$_2$O$_3$×2 SiO$_2$) forms that is of clearly lower hardness than corundum. An abrasive grain based on corundum with such a number of occlusions is therefore of little use for the processing of materials such as hardened steel, chromium steel, cast iron or similar materials that make great demands on the performance potential of the abrasive grain.

U.S. Pat. No. 4,252,544 describes an abrasive grain that has a density of more than 3.75 g/cm$^3$ ($\geq$90% of the theoretical value) and a Knoop hardness of more than 1,900 kg/mm$^2$, that consists of 98% of aluminum oxide and whose structure is made up of a mixture of coarse crystals in a range of 3–10 μm and fine crystals whose median particle size is less than 2 μm. The abrasive grain is produced by mixing preferably 20 to 50 weight percent of electro-corundum with a particle size of 3 to 10 μm and calcined Bayer alum earth (preferably 80 to 50%) whose particle size lies between 0.2 and 1 μm; by adding water and a binder while kneading; by extruding the mixture and subsequently sintering the crushed extruded material. The sintering temperatures lie at 1,550° C. to 1,650° C.

While such a material disposes of clearly more favorable abrasive properties than the previously described materials, its structure is still clearly coarser as compared with the aforementioned submicron corundums produced through sol-gel technology, and its density is considerably lower, meaning that a material according to U.S. Pat. No. 4,252,544 is less tough and strong than the materials on sol-gel basis with a submicron structure.

The toughness and strength of an abrasive grain have varying effects on the abrasion process. On the one hand, great toughness and strength are needed to prevent the abrasive grain from wearing out too quickly; on the other hand, sharp cutting edges are needed for an efficient grinding process. Sharp cutting edges can be formed, on the one hand, when the worn-out and rounded grain breaks out of its binding, bringing to bear fresh grains with sharp edges from an underlying layer, or when—in a more favorable case—smaller areas are broken off the abrasive grain itself due to the forces that affect the abrasive grain during the grinding process, thereby forming fresh cutting edges without the loss of the grain. The tougher and stronger an abrasive grain is, the larger its performance potential will be, which, however, can be utilized only if one succeeds in ensuring the self-sharpening of the abrasive grain described above. In that case, the forces affecting the grain must be great enough in order to achieve a second sharpening; while at the same time, if possible, a breaking off of the grain should be avoided. However, the stronger the forces that work or rather must work on the individual grain in order to bring about a second sharpening effect, the better and more strongly the grain must be imbedded in the abrasive material.

One use in which the abrasive grain is exposed to high pressures is, for example, the rough grinding of plate slabs and billets in foundry operations or in steel mills where sinter corunds are frequently used in so-called hot-pressed disks. Synthetic resin serves as the basis to bind the grain. The disks themselves are highly compressed and almost without any pores.

If one takes a general look at the wear and tear mechanism of a conventional, coarsely crystalline abrasive grain during the abrasion process one will realize that at first the grain wears out, becoming more and more dull, in order to finally break out completely from its binding. The corunds with a microcrystalline structure now have the advantage that, after the primary edges are worn out and rounded, smaller areas of the grain itself can break off and thereby form new cutting edges that enter into the grinding process again. This process repeats itself and the abrasive grain itself breaks off from its binding much later. In other words, the grinding disk wears out less quickly and thus provides greater abrasion performance. The finer the crystals and the more densely a sinter corundum is structured, the tougher the material will be, and the smaller the areas that will break off from the grain. That means that the self-sharpening described above can repeat itself several times depending on the grain size; the cutting edges themselves will be in use longer, and thereby, at least theoretically, a greater abrasion performance should be achieved. The basic preconditions for a meaningful functioning of an efficient second sharpening is of course that the grain is of a basic strength that prevents the grain from abrading and wearing out too quickly.

But now it happens, particularly in the case of the above-mentioned grinding with hot-pressed disks, that a reverse effect makes itself felt that affects the abrasion performance negatively. If one wishes to increase the grinding performance and the serviceable life of a disk by utilizing more and more finely structured and denser grain materials, one will realize that from a certain toughness of the material on—which in turn depends on the density and the crystal structure—the forces necessary to bring about a second sharpening exceed the binding forces, meaning that the grain, as usual, will become more dull but will no longer re-sharpen itself, instead it will suddenly break out of its binding. The abrasion performance and the serviceable life of such a disk with an alleged "better" abrasive grain thus can turn out to be much lower than that of a disk with an abrasive grain of lower density and coarser structure.

If one still wishes to exploit the higher performance potential of the abrasive grain, one customarily starts by improving the imbedding of the grain. The more resistance the binding offers to a breaking off of the abrasive grain from the imbedding, the stronger the effect of the disk. But the degree of hardness of any abrasive disk can be increased only to a certain extent, and particularly with the use of synthetic resin as a basis for the binding, the optimization potential for the binding frequently does not suffice to anchor a microcrystalline, preferably submicron, dense grain so firmly that it can fully bring to bear its performance potential that, at least theoretically, should exist due to its structure.

The problem can be solved in part by using the sinter corundum not in its pure state but as a mixture together with conventional melting corundum. This method has proved its value especially with the above-mentioned sol-gel corundums that are usually utilized as a mixture with conventional corundum types in padded abrasive materials as well as in abrasive disks. Put in simple terms, in such a combination the conventional corundum provides the necessary cutting power while the sinter corundum accounts for the serviceable life of the material and its abrasive performance.

EP-B-0 395 091 describes sintered fibrous sol-gel abrasive grains whose crystallite size preferably lies below 1 μm and that are produced by extruding a Böhmite gel with a solid contents of preferably between 45–64 weight percent. Similar to the case of the afore described rod-shaped corundums, it is also possible in the case of submicron sol-gel corundums to drastically increase the yield of merchantable graining in a methodical fashion. In addition, the material shows even better abrasion performance in certain grinding operations due to its grain shape than a comparable sol-gel corundum that was crushed through conventional methods and that does not dispose of any preferable shape.

However, if one wishes to assess the performance potential and the usefulness of a certain abrasive grain it is, in principle, unavoidable to define the area of use for the abrasive grain as well, since depending on the area of application the most varied demands are made on an abrasive grain; those demands depend, among other things, for example on what material is to be treated with what objective (surface quality, abrasion, etc.). In practice, nearly all steel types, metals, alloys, the most varied types of woods, stone, glass, synthetics, lacquers and many more are being treated with abrasives. Even though one tries to use, as universally as possible, an abrasive grain that possesses the relevant properties for the grinding process such as great hardness, toughness, chemical and thermal resistance and many others more, there occur, time and again, shifts in the assessment of the individual abrasive grain types among each other since, depending on the area of application, certain properties of a grain such as toughness, hardness, brittleness, thermal resistance and/or chemical resistance, are of greater importance. Add to this the economic aspect. For example, it does not make much sense to treat a material that is relatively easy to process with rather expensive materials with a high performance potential if their strong performance does not come to bear at all in a particular case and if a considerably less expensive grain shows a similar abrasion result.

For example, in spite of their potentially very great general performance potential, there are several reasons for not using rod-shaped microcrystalline corundums made according to EP-B-0 395 091 in hot-pressed disks. The abrasive grain described in EP-B-0 395 091 has an extraordinarily fine structure and is very dense, meaning that a re-sharpening requires extraordinarily strong forces that under certain circumstances can not be compensated through an adaptation of the imbedding; one must therefore assume a relatively high attrition of the disk due to the breaking off of grains. In addition, its very application in rough grinding where the known, relatively inexpensive sinter corundums show good abrasion performance, must be put in question for economical reasons since the production costs of an abrasive grain made according to EP-B-0 395 09 lie clearly above those of conventional sinter corundums due to the expensive raw materials and costly sol-gel process even if it may have been possible to significantly increase the yield of a particular grain by way of process management.

SUMMARY OF THE INVENTION

The present invention is based on the task of providing an improved abrasive grain for a number of grinding operations—for which the above-named coarse grinding with hot-pressed disks was mentioned merely as an example in view of its high market volume—that has a great performance potential based on its microstructure and density and a high linkage strength based on its grain shape and/or surface and that, at the same time, can be produced cost-effectively. This concerns not only the area of bound grinding materials but it also applies to the area of padded grinding materials.

According to the invention, this task is solved by providing sintered microcrystalline abrasive grains comprised of $\alpha$-$Al_2O_3$ having a hardness of $HV_{0.2}$ of $\geq 15$ GPa, a density of $\geq 95\%$ of the theoretical density, a median primary crystal size of $<2$ µm and an $Al_2O_3$ content of not less than 98 weight percent, wherein the abrasive grains comprise solid or hollow bodies in the shapes of rods, cylinders, polygons, stars, and rods with wave-shaped surfaces. In certain advantageous embodiments, the abrasive grains have median primary crystal sizes $<1$ µm.

In certain embodiments, the abrasive grains comprise solid bodies having diameters $\leq 6$ mm. In other embodiments, the abrasive grains comprise hollow bodies having diameters $\leq 12$ mm, and preferably have wall thicknesses between 0.01 and 2 mm. The ratio of diameters to length of the abrasive grains may advantageously lie between $0.1/1$ and $20/1$, and preferably between $0.2/1$ and $1/1$.

In another aspect, the present invention provides a method of producing the abrasive grains comprising the steps of admixing an $\alpha$-$Al_2O_3$ powder starting material with a median particle diameter of 2 µm with a binder and a solvent to form a mixture that is then processed into an extrudable mass, extruding and further processing the mass into shaped bodies, which are then sintered within a temperature range of 1,300° C. and 1,750° C.

The starting material is preferably produced through wet grinding from a coarser preliminary material of $Al_2O_3$. The wet grinding process may employ triturators, ball triturators or vibration mills.

Methyl cellulose, polyvinyl butyrate, emulsified acrylate, polyvinyl alcohol, polyvinyl pyrrolidone, polyacrylate starch, silicate binders and/or lignin sulfonate may be used as binders for the extrudable mass. One or more of the auxiliary materials from the group of dispersing agents, lubricants and/or softeners are preferably added to the mixture of binder, starting material and solvent. Dispersing aids such as ammonium polyacrylate, sodium silicate, Manhattan fish oil, polyethylene imine, sodium lignin sulfonate and alginate may be used. Lubricants such as ammonium stearate, wax emulsion oleic acid, Manhattan fish oil, stearic acid, palmitic acid, linoleic acid, myristic acid and/or lauric acid may be used. Softeners such as glycerin, polyethylene glycol, octyl phthalate and ethylene glycol may be employed. And inorganic or organic solvents such as water, toluol, benzol, isopropanol, acetone, xylene, hydrocarbons, such as hexane, heptane, octane, nonane, chlorinated hydrocarbons such as trichloroethane, tetrachloromethane, chloroform and methylene chloride may additionally be employed.

In order to extrude the extrudable mass, a kneader with a delivery screw, a single-screw extruder, a compounder, an expansion extruder, a twin-screw extruder, a piston press or a planetary extruder may be employed. The mass to be extruded is preferably ventilated prior to the extrusion, and the extruded materials dried to green bodies with a moisture contents of $<20$ weight percent. The green bodies are calcined within a temperature range between 150° and 800° C. prior to crushing, preferably to a granulate of a pre-set length by means of a granulating unit (e.g., rotating blades, cross cutters or longitudinal cutters.) The extruded materials, the green bodies or the granulate are crushed into shaped bodies by means of a comminution aggregate such as, for example, cutting mills, beater mills and cylinders.

The step of sintering the shaped bodies preferably occurs at temperatures below 1,500° C.

The process according to the invention comprises the following essential process steps:
  a) powder treatment,
  b) production of an extrudable ceramic mass,
  c) extrusion of the mass,
  d) crushing or cutting into sections,
  e) sintering that are described more in detail below.

For providing an $\alpha$-$Al_2O_3$ powder with a median particle size of $<2$ µm, in principle any $\alpha$-$Al_2O_3$ or, respectively, any starting material for $\alpha$-$Al_2O_3$, will be suitable.

However, for this purpose, commercially obtainable $\alpha$-$Al_2O_3$ powders are utilized whose median particle size lies between 1 and 10 µm that are then processed, via wet grinding, into a suspension with a median particle size of $<2$ µm. When choosing the starting material, cost considerations are of a primary concern, too. The materials mentioned above are available on the market at relatively low cost and can be ground to the desired fineness of the product with a reasonable expenditure of energy. However, from an engineering point of view, there is no reason why finer or coarser materials can not be utilized that will then be more expensive or, respectively, that will require more energy for their treatment. Of course it is also thinkable that powders are employed whose particle size lies within a range that allows their direct use without any additional grinding.

When choosing the starting materials one must take into account that the product properties depend to a large extent on the degree of fineness of the starting material. Therefore, it is advantageous to use $\alpha$-$Al_2O_3$ powders with a particle size of $d_{99} \leq 1$ µm if one wishes to obtain products with a particularly fine crystallite structure.

Vibration mills, triturators or ball triturators can be used as grinding aggregates. The grinding time depends on the starting material and the mill type being used. In order to penetrate into the desired range of fineness, it makes sense from an engineering point of view to perform a wet grinding. However, according to the invention, any other process may be used that provides α-Al$_2$O$_3$ with the desired product fineness. The slip produced through wet grinding is subsequently dried for which purpose all drying methods known to engineering are suitable. For economic reasons, a spray dryer can be given preference. The powder obtained thereby is then mixed or kneaded with a solvent and a binder to form an extrudable mass. Depending on the needs, dispersing agents, lubricants and softeners may be added to the mix, something that depends not in the least on the type of extruder one wishes to use for the shaping step. Prior to the extrusion, preferably however even before the wet grinding, it is also possible to add sintering additives (sintering aids, crystal-growth inhibitors, etc.) that allow us to further influence the structure in the abrasive grain. Suitable sintering additives are, for example, the oxides of the elements Mg, Co, Ni, Zn, Hf, Ti, Ce, Zr, Cu, Li, Sr, Ba, K, Nb, Si, B and/or rare earths.

All binders that are customarily used for ceramic masses can be used as binders, such as methyl cellulose, polyvinyl butyrals, emulsified acrylates, polyvinyl alcohols, polyvinyl pyrrolidones, polyacrylics, starch, silicon binders and lignosulfonates. The preferred solvent is water. But, depending on the needs, the usual inorganic or organic solvents such as alcohols, ketones, aromatic compounds and hydrocarbons may be used. Polyacrylates, silicates, Manhattan fish oil, polyethylene imine, lignosulfonates and alginates are used as dispersing agents. The conventional lubricants that can be used for the abrasive grain according to the invention, include, for example, ammonium stearates, wax emulsions, oleic acid, Manhattan fish oil, stearic acid, wax, palmitic acid, linoleic acid, linolenic acid, myristic acid and lauric acid. Finally, polyethylene glycol, octyl phthalates and ethylene glycol are some examples that may be used as softeners.

The overlaps between the individual compound groups indicate that some of the substances listed above have or may have multifunctional uses. All of the substances and compounds listed above are merely thought as examples without there being any limitation. According to the invention, any compound with a corresponding effect that is suitable for the shaping process may be used.

In general it was found that satisfactory product qualities could be achieved with the most varied compositions of the mass if the production method is adapted to the consistency and the composition of the mass and if suitable aggregates are used.

The objective of the mixing process is to achieve a mass that is as homogeneous as possible. For this purpose, all kneaders or mixers customarily used in ceramic technology may be employed for the homogenization process. The extrusion itself may be carried out in any flask that can be condensed hydraulically and that is equipped with an aperture (mouthpiece). However, it is advantageous to use kneaders equipped with a delivery screw, single-screw extruder, compounder, expansion extruder, twin-screw extruder, planetary extruder and/or piston presses. The working conditions themselves do not differ from the conditions customary for an extrusion and essentially depend on the choice of extruder and the consistency of the mass being used. In general it was found that the product quality is relatively independent of the selected extrusion process, and that following the corresponding adaptation of the mass and the extrusion conditions, any of the methods mentioned above may be employed.

Ventilation prior to the extrusion is advantageous, particularly if one wishes to obtain very dense products. This can preferably be done by mixing or kneading the mass in a vacuum or by performing the extrusion itself in an aggregate that is equipped with a ventilation unit. Particularly suited to this purpose are screw extruders or piston presses with a ventilation unit that allow ventilation of the mass prior to the extrusion, thereby preventing the formation of pores in the product caused by air trappings in the mass.

The cutting into lengths or, respectively, the crushing of the extruded material can occur immediately following the extrusion, for example through a granulating unit with rotating blades, or following an interim step during which the extruded green body is first dried to a humidity contents of <20 weight percent relative to the amount of aluminum oxide used. No special requirements need to be taken into account for the drying step itself, and the drying aggregates customarily used in the ceramic industry may be used. From a process-engineering point of view, the use of a belt dryer or of a microwave dryer is particularly advantageous. Following the drying process, high-speed cutting machines such as cross cutters, billet cutters or longitudinal cutters can be used as granulating units. However, in principle, it is also possible to employ conventional crushing aggregates such as cutting mills, beater mills and cylinders to crush the extruded materials, taking into account, however, that in that case relatively high yield losses may easily occur, particularly if complicated shapes are involved.

The choice of diameter, shape and length of the extruded materials depends largely on the desired area of application for the resulting abrasive grain. For example, for use in abrasive disks, shaped bodies with a diameter/length ratio of $\leq 1$ are preferred, while for padded grinding materials shaped bodies with a diameter/length ratio of $\geq 1$ are given preference. The surface of the shaped body mainly follows the intended area of application as well. While for areas of application during which relatively low pressures act against the grain smooth, rod-shaped full bodies can be employed without any problem, adhesion in the imbedding should be improved by enlarging the surface of the shaped body for uses in which higher pressures act against the grain. Depending on the intended use of the shaped body, the most varied options are available. In a simple case an enlargement of the surface can be achieved by treating the surface of the shaped body, increasing the surface, for example, by attaching the most minute particles, e.g. pigments, on it, thereby offering the binder more area to cause adhesion of the grain to the grinding material. This coating of the grain is a known method that has been practiced for years to improve the imbedding of any adhesive grain. In principle, all methods that are known and that have been described in the literature can be used for a surface treatment of the shaped body produced in accordance with the invention. To this end, silicate binders or phosphates are used preferably as binders; but organic or other inorganic binders may be used as well. Frequently, inorganic pigments are employed as the most fine-grained materials for the actual enlargement of the surface; iron-oxide pigments are often used for this because of their availability, fineness and low cost. In addition to the pigments or finest-grained particles, so-called abrasion-active substances such as halogenides or chalcogenides can be built into the coating that may favorably influence the abrasion process through chemical reactions.

For many abrasion operations, however, a simple coating will not suffice to improve the embedding to the extent that the abrasive grain will stay in its binding even under great stress. It has been found that in such cases it is advantageous to select the shape of the sintered shaped body in such a way that there is a larger surface available and thus better adhesion to the binding. FIGS. 1 through 7 show a few examples for such shaped bodies with a larger surface, without this selection constituting any limitation. According to the invention, all industrially produced shapes are suitable. Hollow bodies have proved to be particularly advantageous for padded grinding materials as well as for abrasive disks, as shown for example in FIGS. 2, 3, 5, and 6. Preferably, the entire hollow space is filled with the binder during the embedding in the grinding tool so that following the hardening of the binder the shaped body is properly anchored in the grinding material. The wall thickness, the diameter and the length of the hollow bodies as well as their ratios between each other depend largely on the desired use. Since the shaped body produced according to the invention is intended for use as an abrasive grain, its dimensions are within the range of the usual granulation. That means that the maximal diameter for a full body is approximately 6 mm and for a hollow body approximately 12 mm, with the ratio between wall thickness and diameter lying between $0.1/1$ and $0.4/1$, preferably between $0.2/1$ and $0.3/1$. Depending on the area of application, the ratio between length and diameter varies between $0.1/1$ and $20/1$. Shaped bodies with a length/diameter ratio of $\leq 1$, preferably between $0.2/1$ and $1/1$, are mostly used for padded grinding materials, since it is considerably easier to place a flat abrasive grain in uniform direction on a padding than an oblong, rod-shaped body. Those considerations, in turn, do not play any role in the case of bound grinding materials; here, shaped bodies with a length/diameter ratio of $\geq 1$, preferably between $1/1$ and $10/1$, are mostly used. The advantages of the oblong shaped bodies are also grounded in process engineering since it is considerably easier to divide or to comminute a billet obtained through extrusion into oblong shapes. In addition, outstanding anchoring in the binder of the abrasive grains concerned is possible in the case of oblong hollow bodies.

Normally, the billets obtained through extrusion can be cut or treated in the desired ratio without any additional drying step being required. However, if the moisture contents of the mass is above 20 weight percent, a drying step prior to any further processing is recommended. For economic and process-engineering reasons the preferred range of residual moisture lies below 10 weight percent. However, it is perfectly possible to directly process masses with a moisture contents higher than 20 weight percent.

In special cases, but only if it involves simple geometries, comminution or treatment will be possible following calcination or sintering.

Customarily, sintering occurs directly following the treatment step at temperatures between 1,300 and 1,750° C. All types of furnaces are suitable for the sintering process that are customarily employed for the firing of ceramic materials and that cover the range between 1,300 and 1,750° C. In certain cases, particularly in the case of complicated shapes, it may be advantageous to execute a calcination step prior to sintering in order to remove the binder and any residual solvent. Customarily, calcination is carried out within a temperature range between 150 and 800° C. For this step, all known furnace types that are being employed in the ceramics industry are suitable as well.

The choice of the sintering temperature, the sintering time and possible sintering programs depends on what properties the desired product is supposed to possess, and it is variable within a wide range. In addition to the product quality, economic considerations play a role in choosing the conditions as well. By selecting the proper sintering temperature and time, it is possible to purposefully influence the product properties such as hardness, density and primary crystal size. This consideration plays a role in all grinding operations in the areas of padded grinding materials as well as for bound grinding materials for which no extremely high pressures are utilized and for which a re-sharpening of the abrasive grain is intended to occur even under "milder" conditions. For this application lower sintering temperatures seem to be advisable so that no complete densification will occur during sintering and, while the material does already show a relatively great hardness of $\geq 15$ GPa and a density that preferably lies above 95% of the theory, it still is clearly below the hardness and density values of approximately 20 GPa and >98% of the theoretical density that for many applications are desired to be as high as possible. However, these high values can be reached without any problems by choosing a correspondingly higher temperature without any undesirable crystal growth occurring.

BRIEF DESCRIPTION OF THE FIGURES OF THE DRAWING

FIG. 7 is supposed to demonstrate the preferred microcrystalline structure of the shaped body according to the invention.

FIG. 1 is an illustration of a shaped body according to the invention in the form of a rod-shaped solid body;

FIG. 2 is an illustration of a shaped body according to the invention in the form of a rod-shaped hollow body;

FIG. 3 is an illustration of a shaped body according to the invention in the form of a star-shaped flat hollow body;

FIG. 4 is an illustration of a shaped body according to the invention in the form of a star-shaped solid body;

FIG. 5 is an illustration of a shaped body according to the invention in the form of a ring-shaped solid body;

FIG. 6 is an illustration of a shaped body according to the invention in the form of a hexagonal flat hollow body; and FIG. 7 is an electron-microscopic photo of a shaped body according to the invention in the form of a rod-shaped hollow body.

DETAILED DESCRIPTION OF CERTAIN PREFERRED EMBODIMENTS OF THE INVENTION

Figure 1:
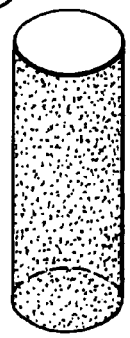
FIGS. 1 through 7 that are explained below show some of the special model designs of the shaped bodies produced according to the invention; they merely serve to illustrate the invention at hand and do not represent any limitation. While FIGS. 1 through 6 reflect particular geometric model designs.
Figure 2:
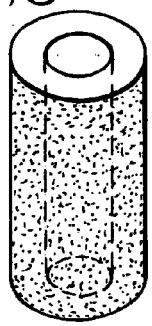
Figure 3:
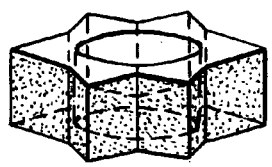
Figure 4:
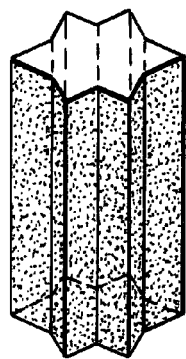
Figure 5:
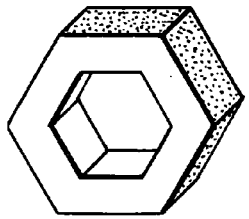
Figure 6:
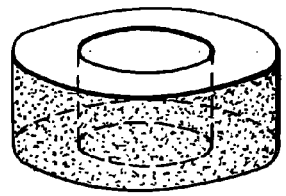
Figure 7:
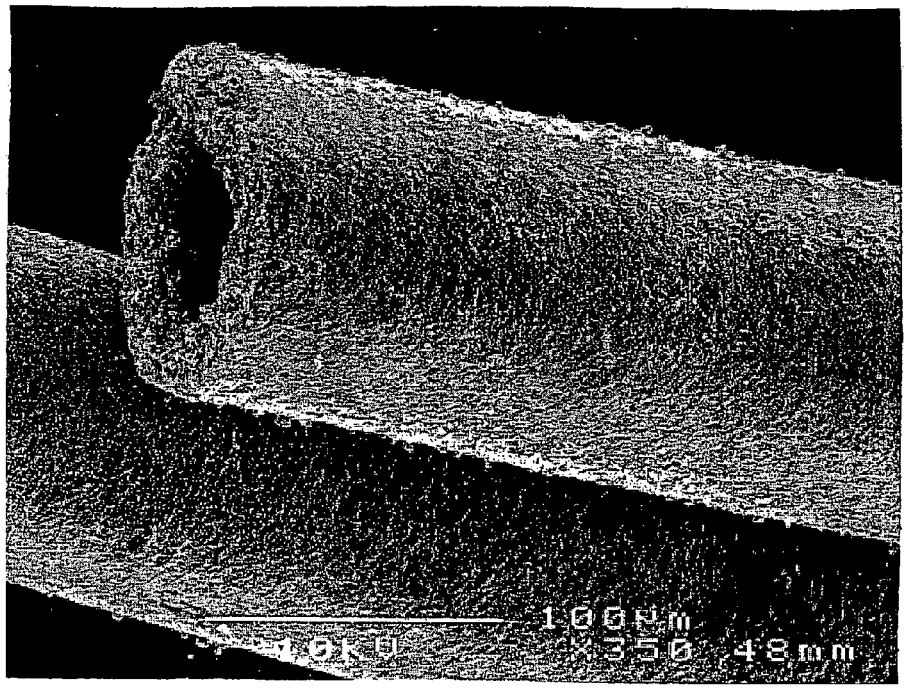

In the following, the invention is to be explained by way of examples without this representing any limitation.

EXAMPLE 1

An $\alpha$-aluminum oxide with a maximum particle size $d_{99}$ of approximately 1 µm and a median particle size $d_{50}$ of approximately 0.5 µm that was obtained from a coarser $\alpha$-$Al_2O_3$ powder through wet grinding and subsequent spray drying was mixed with methyl cellulose, polyethylene glycol, oleic acid and glycerin as binder additives and water as a solvent and turned into an extrudable mass with a kneader and subsequently extruded in a piston extruder at a median pressure of 150 bar. The mouthpiece of the extruder consisted of a punched disk with a hole diameter of approximately 1.3 mm.

The extruded billets were cut to the desired length of the shaped body with a rotating blade located immediately after the outlet opening. Sintering of the green bodies was carried out in a sliding-bat furnace at 1,480° C. in the presence of air. The sintering time was approximately 1 hour. The sintered, microcrystalline shaped bodies obtained in this fashion possessed a hardness $HV_{0.2}$ of 19 GPa, a median crystallite size of 0.6 µm, and the density reached 97.5% of the theoretical density.

The median diameter of the rods lay at approximately 1 mm and the length/diameter ratio lay between ½ and ¼.

EXAMPLE 2

The production of the shaped bodies occurred analogously to Example 1. In lieu of the oleic acid, ammonium polyacrylate was used as a binder component. Sintering was carried at 1,475° C. out in a revolving tubular kiln instead of a sliding-bat kiln. The sintering time amounted to approximately 30 minutes. Crushing of the extruded material occurred in a cutting mill without any interim steps.

The sintered, microcrystalline shaped bodies obtained in this fashion possessed a hardness $HV_{0.2}$ of 20.2 GPa, a median crystallite size of 0.5 µm, and the density reached 98.6% of the theoretical density.

EXAMPLE 3

The production of the shaped bodies occurred analogously to Example 1.

After sintering, the rod-shaped bodies resulting from the production process were carefully mixed with a mixture of water glass, glass powder and iron oxide pigment until the surface was equipped with a uniform coating of the pigment. Subsequently the abrasive grain coated in this fashion was fired at 900° C. in a revolving tubular kiln in order to solidify the binding of the pigment on the surface of the abrasive grain rod.

EXAMPLE 4

The production of an extruded mass and the extrusion occurred as described in detail in Example 1. In lieu of the simple punched disk, a mouthpiece with a ring-shaped opening was utilized. The external diameter of the ring was 5.2 mm, the internal diameter of the ring, 3.4 mm.

The extruded hollow billets were placed on a conveyor belt after the exit opening and cut to the desired length with a cross cutter. The tube-shaped green bodies produced in this fashion were heated to 800° C. at a heating rate of approximately 100° C. per hour in order to remove the binder components and the solvent. The green bodies dried in this fashion were then sintered in a sliding-bat kiln at 1,480° C.

The sintered, microcrystalline shaped bodies obtained in this fashion possessed a hardness $HV_{0.2}$ of 20.4 GPa, a median crystallite size of 0.6 µm, and a density value of 98% of the theoretical density.

The external diameter of the sintered, microcrystalline shaped body lay at approximately 4 mm and the wall thickness of the tube amounted to approximately 0.75 mm, resulting in an interior diameter of approximately 2.5 mm. The ratio of length to external diameter lay between ⅓ and ⅔.

EXAMPLE 5

The green body production was carried out in the fashion described in Example 4.

However, the hollow billets were cut in such a way that flatter shaped bodies resulted, with a length/diameter ratio of ¼. The shaped bodies obtained in this fashion were sintered immediately after the cutting process for 1 hour at 1,440° C.

The sintered, microcrystalline shaped bodies possessed a hardness $HV_{0.2}$ of 16.7 GPa, a median crystallite size of 0.5 µm, and 96.4% of the theoretical density.

EXAMPLE 6

Production of the extrudable mass and its extrusion corresponded to the method described in Example 1. In lieu of the aperture, a mouthpiece with an opening in the shape of a star-shaped ring was used. The median exterior diameter of the ring was 5 mm, and the internal diameter, 3 mm.

The hollow billets obtained in this fashion were cut with a cross cutter to a length/exterior diameter ratio of ¼ and sintered immediately thereafter in the sliding-bat kiln at 1,480° C.

The sintered, microcrystalline shaped bodies possessed a hardness $HV_{0.2}$ of 20.2 GPa, a median crystallite size of 0.6 µm, and a density of 97.5% of the theoretical density.

EXAMPLE 7

Abrasion Test 1 (Abrasive Disks)

The shaped bodies of Example 1 through 4 were used in grinding disks bound in synthetic resin to process carbon steel and compared with the grinding properties of commercially available 25% zircon corundum and rod-shaped sinter corundum on bauxite basis. The grinding time was 15 minutes. The comparative granulations were entered in grain size F20.

TABLE 1

Disk Test Abrasion Results (HP Disks)

| Grain Type | Stock Removal (kg) | G-Factor | Grinding Performance (%) |
| --- | --- | --- | --- |
| Example 1 | 89 | 111.3 | 133 |
| Example 2 | 86 | 107.5 | 128 |
| Example 3 | 96 | 137.1 | 143 |
| Example 4 | 107 | 178.3 | 159 |
| Comparative Example 1 (Zircon Corundum 25%) | 67 | 75.6 | 100 |
| Comparative Example 2 (Sinter Corundum on bauxite basis) | 44 | 36.6 | 66 |

EXAMPLE 8

Abrasion Test 2 (Grinding Belt)

The shaped bodies produced according to Examples 5 and 6 were used for the abrasion test. Commercial zircon corundum and sol-gel corundum were used as reference grains. The abrasive grains according to 5 and 6 were mechanically attached to the belt while the comparison grains were scattered electrostatically. The comparison shaped body. The material being treated was turbine steel. The grinding time was 30 minutes. The grinding results are combined in Table 2; it must be noted that in addition to the improved abrasion effect of the abrasive grain according to the invention it was also possible to achieve a clearly superior abrasion appearance (surface quality).

TABLE 2

Grinding Tests (Belt Grinders)

| Grain Type | Stock Removal (g) | Grinding (%) Performance |
| --- | --- | --- |
| Example 5 | 1,438 | 168% |
| Example 6 | 1,535 | 179% |
| Sol-gel corundum | 856 | 100% |
| Zircon corundum | 472 | 55% |

The invention claimed is:

1. Method for the production of sintered microcrystalline shaped bodies comprising abrasive grains consisting essentially of $\alpha$-$Al_2O_3$, said bodies have a hardness $HV_{0.2}$ greater than or equal to 15 Gpa, a density a median primary crystal size of 0.5 to 0.6 µm greater than or equal to 95% of the theoretical density, and an $Al_2O_3$ content of not less than 98 weight percent, comprising the steps of:
   providing an $\alpha$-$Al_2O_3$ powder with a median particle size $d_{50}$ of less than 2 µm;
   wet grinding the $\alpha$-$Al_2O_3$ powder to a product having maximum particle size $d_{99}$ of less than 1 µm;
   forming a mixture by spray drying the product and subsequently admixing the dried product with at least one binder and at least one solvent;
   processing the mixture into an extrudable mass;
   extruding the extrudable mass to an extrudate;
   processing the extrudate into shaped extruded bodies; and
   sintering the shaped extruded bodies within a temperature range of 1,300° C. and 1,650° C.

2. Method according to claim 1, wherein triturators, ball triturators or vibration mills are used for the wet grinding.

3. Method according to claim 1, wherein the at least one binder is selected from the group consisting of methyl cellulose, polyvinyl butyrate, emulsified acrylate, polyvinyl alcohol, polyvinyl pyrrolidone, polyacrylate starch, silicate binders and lignin sulfonate.

4. Method according to claim 1, further comprising the step of adding to the mixture at least one auxiliary material selected from the group consisting of dispersing agents, lubricants and softeners.

5. Method according to claim 4, wherein the dispersing agents comprise at least one material selected from the group consisting of ammonium polyacrylate, sodium silicate, Manhattan fish oil, polyethylene imine, sodium lignin sulfonate and alginate.

6. Method according to claim 4, wherein the lubricants comprise at least one material selected from the group consisting of ammonium stearate, wax emulsion oleic acid, Manhattan fish oil, stearic acid, palmitic acid, linoleic acid, myristic acid and/or lauric acid.

7. Method according to claim 4, wherein the softeners comprise at least one material selected from the group consisting of glycerin, polyethylene glycol, octyl phthalate and ethylene glycol.

8. Method according to claim 1, wherein the at least one solvent comprises at least one inorganic or organic solvent selected from the group consisting of water, toluol, benzol, isopropanol, acetone, xylene, hydrocarbons, hexane, heptane, octane, nonane, chlorinated hydrocarbons trichloroethane, tetrachloromethane, chloroform and methylene chloride.

9. Method according to claim 1, wherein the extrudable mass is extruded in machine selected from the group consisting of a kneader with a delivery screw, a single-screw extruder, a compounder, an expansion extruder, a twin-screw extruder, a piston press and a planetary extruder.

10. Method according to claim 1, further comprising the step of ventilating the mass to be extruded prior to the extrusion step.

11. Method according to claim 1, wherein the extruding the extrudable mass further comprises drying the extrudate to green bodies with a moisture contents of less than 20 weight percent.

12. Method according to claim 1 wherein the processing of the extrudate comprises drying the extrudate to green bodies within a temperature range between 150° and 800° C. and crushing the green bodies to obtain the shaped extruded bodies.

13. Method according to claim 11 wherein the processing into shaped extruded bodies includes crushing the green bodies to a granulate of a target length with a granulating unit.

14. Method according to claim 13, wherein the granulating unit comprises rotating blades, cross cutters or longitudinal cutters.

15. Method according to claim 12, wherein the crushing step is achieved through use of a comminution aggregate.

16. Method according to claim 15, wherein the comminution aggregate is selected from the group consisting of cutting mills, beater mills and cylinders.

17. Method according to claim 1, wherein the shaped bodies are sintered at temperatures between 1,300° C. and 1,500° C.

18. Method for the production of sintered microcrystalline shaped bodies comprising the steps of:
   providing an $\alpha$-$Al_2O_3$ powder with a median particle size $d_{50}$ of less than 2 µm;
   wet grinding the $\alpha$-$Al_2O_3$ powder to a product having maximum particle size $d_{99}$ of less than 1 µm;
   forming a mixture by spray drying the product followed by admixing the dried product with at least one binder and at least one solvent;
   processing the mixture into an extrudable mass;
   extruding the extrudable mass to an extrudate and drying the extrudate to green bodies with a moisture content of less than 20 weight percent; and
   processing the green bodies into shaped bodies; and
   sintering the shaped bodies within a temperature range of 1,300° C. and 1,650° C.;
   wherein the sintered shaped bodies comprise $\alpha$-$Al_2O_3$, said bodies have a hardness $HV_{0.2}$ greater than or equal to 15 Gpa, a density a median primary crystal size of 0.5 to 0.6 µm of greater than or equal to 95% of the theoretical density, and an $Al_2O_3$ content of not less than 98 weight percent, and the shaped body is a solid body or a hollow body in the shape of a rod, a cylinder, a polygon, a star or a rod with a wave-shaped surface;
   wherein a ratio of the maximal diameter of the shaped body to the length of the shaped body lies between $0.1/1$ and $20/1$.

* * * * *